(12) United States Patent  (10) Patent No.: US 10,606,410 B2
Gu et al.  (45) Date of Patent: Mar. 31, 2020

(54) METHOD FOR CALIBRATING TOUCHSCREEN PANEL WITH INDUSTRIAL ROBOT AND SYSTEM, INDUSTRIAL ROBOT AND TOUCHSCREEN USING THE SAME

(71) Applicant: ABB Schweiz AG, Baden (CH)

(72) Inventors: Hao Gu, Shanghai (CN); Liwei Qi, Shanghai (CN); Roger Mellander, Västerås (SE); Daniel X. Wappling, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/048,773

(22) Filed: Jul. 30, 2018

(65) Prior Publication Data

US 2018/0364866 A1 Dec. 20, 2018

Related U.S. Application Data

(63) Continuation of application No. PCT/CN2016/072713, filed on Jan. 29, 2016.

(51) Int. Cl.
*G06F 3/041* (2006.01)
*B25J 9/16* (2006.01)

(52) U.S. Cl.
CPC .......... *G06F 3/0418* (2013.01); *B25J 9/1692* (2013.01); *G05B 2219/39021* (2013.01); *G05B 2219/39092* (2013.01)

(58) Field of Classification Search
CPC ................ G06F 3/0418; B25J 9/1692; G05B 2219/39032; G05B 2219/39021
See application file for complete search history.

(56) References Cited

U.S. PATENT DOCUMENTS

| 4,853,498 A | 8/1989 | Meadows et al. |
| 2008/0004750 A1* | 1/2008 | Ban .................. B25J 9/1692 700/245 |

(Continued)

FOREIGN PATENT DOCUMENTS

| CN | 101354621 A | 1/2009 |
| CN | 103235661 A | 8/2013 |

(Continued)

OTHER PUBLICATIONS

International Search Authority, International Patent Application No. PCT/CN2016/072713, Written Opinion, dated Oct. 26, 2016, 4 pages.

(Continued)

*Primary Examiner* — Andrew Sasinowski
(74) *Attorney, Agent, or Firm* — Taft Stettinius & Hollister LLP; J. Bruce Schelkopf (57) ABSTRACT

A method for calibrating a touchscreen panel and the system, the industrial robot and the touchscreen panel using the same. The method including the steps of: (a) defining at least one area of the touchscreen with predetermined accuracy for position measuring; (b) recording a plurality of kinematic parameters of the industrial robot on a plurality of first touch points on the at least one area of the touchscreen; (c) recording a plurality of first position values on the plurality of first touch points on the at least one area of the touchscreen; (d) determining a first calibration data for the kinematic model of the industrial robot using the kinematic parameters and using the first position values; (e) computationally correcting errors of the kinematic model of the industrial robot using the first calibration data; (f) recording a plurality of second position values on a plurality of second touch points on the at least one area with at least a portion of its border extending outwards; (g) determining a second calibration data for the touchscreen using the kinematic (Continued)

parameters and using the second position values; (h) computationally correcting errors of position measurement of the touchscreen using the second calibration data; and iteratively repeating the steps (b) through (h) for different postures of the industrial robot until the iteration step no longer results in significant improvement of the error correction of the kinematic model of the industrial robot.

20 Claims, 5 Drawing Sheets

(56) References Cited

U.S. PATENT DOCUMENTS

| | | | | |
|---|---|---|---|---|
| 2008/0100586 | A1 | 5/2008 | Smart | |
| 2008/0188986 | A1* | 8/2008 | Hoppe | B25J 9/1692 700/263 |
| 2009/0069936 | A1* | 3/2009 | Kock | B23K 11/318 700/254 |
| 2011/0029131 | A1* | 2/2011 | Ban | B25J 9/1697 700/254 |
| 2013/0278539 | A1* | 10/2013 | Valentine | G06F 3/0418 345/174 |
| 2014/0309775 | A1 | 10/2014 | Jenkinson | |

FOREIGN PATENT DOCUMENTS

| | | |
|---|---|---|
| CN | 103472953 A | 12/2013 |
| CN | 103793112 A | 5/2014 |
| GB | 2 188 754 A | 10/1987 |
| JP | S60218108 A | 10/1985 |
| JP | 2002149347 A | 5/2002 |
| JP | 2005271103 A | 10/2005 |
| JP | 2013073287 A | 4/2013 |
| JP | 2014052696 A | 3/2014 |
| WO | 2016154995 A1 | 10/2016 |

OTHER PUBLICATIONS

State Intellectual Property Office of the P.R. China, International Search Report & Written Opinion issued in corresponding Application No. PCT/CN2016/072713, dated Oct. 26, 2016, 5 pp.
European Extended Search Report dated Jul. 17, 2019 issued in EP Application No. 16887168.9 (7 pages).
Japanese Office Action dated Jun. 25, 2019 issued in JP Application No. 2018-555804 (5 pages).

* cited by examiner

METHOD FOR CALIBRATING TOUCHSCREEN PANEL WITH INDUSTRIAL ROBOT AND SYSTEM, INDUSTRIAL ROBOT AND TOUCHSCREEN USING THE SAME

TECHNICAL FIELD

The invention relates to calibration of a touchscreen, and in particular to calibration of position measurement of a touchscreen.

BACKGROUND ART

A touchscreen panel is an input device normally layered on the top of an electronic visual display of an information processing system, which is common in devices such as game consoles, personal computers, tablet computers, electronic voting machines, and smartphones. They can also be attached to computers or, as terminals, to networks. A user can give input or control the information processing system through simple or multi-touch gestures by touching the screen with a special stylus/pen and/or one or more fingers.

There are variety of touchscreen technologies with different methods of sensing touch, such as resistive touchscreen, surface acoustic wave touchscreen, capacitive touchscreen, and so on. Taking capacitive touchscreen as an example, touching the screen of the touchscreen panel results in a distortion of the screen's electrostatic field, measurable as a change in capacitance. Different known technologies may be used to determine the location of the touch, and the location is then sent to the touchscreen panel controller for processing. U.S. Pat. No. 4,853,498 A discloses a location determination method, where position measurement for capacitive touchscreen panel has conductive face plates and apparatus to generate an address signal indicative of styling contact location. The touchscreen panel according to U.S. Pat. No. 4,853,498 A provides a faceplate with an electrically conductive layer of a consistent resistivity employs a position measurement apparatus to generate an address signal indicative of a position on the faceplate in contact with a stylus. Position measurement signal is applied to a first pair of opposed electrodes and a second pair of opposed electrodes positioned along respective side margins of the faceplate. The resistivity of the conductive layer establishes effective resistances of Rx and Ry between the respective first and second pairs of electrodes. Position measurement subcircuits measure currents drawn through the electrodes whenever the stylus touches the conductive layer, thereby to form an address signal indicative of the location at which the stylus contacts the faceplate. The skilled person should understand that a distance between two touch points on the screen can be calculated using the address signals indicating the locations of such two touch points.

The touch technology trending towards more sensitive, higher resolution, more dimensions (i.e. 3D position measuring with orientations) make it suitable for position measuring in an industrial robot commissioning system. Compared with laser based or encoder based industrial 3D measuring device, touchscreen panel is easy accessible and low-cost.

The position measurement by use of touchscreen panel depends on the established effective resistance at the touch point on the touchscreen, and the distance between two touchpoints as calculated as above has an error as a result of influences of the misplacement of the sensing elements disposed between the touchpoints. Therefore, where the touch points are confined in a relatively small area of the screen, for example such as relatively small area encompasses sensing elements less than 10 in a direction, the error for the distance of their position measurements is small and thus can be ignored for a relatively high accurate position measurement. However, accuracy of the position measurement becomes unsatisfactory when it is applied to a relatively large area of the touchscreen, for example encompasses sensing elements more than 10 in a direction.

A coordinate measuring machine (CMM) can be used to calibrate the touchscreen coordinate system to reduce the position measurement error. However, this makes the industrial robot commissioning system more costly by introduction of extra device like CMM.

BRIEF SUMMARY OF THE INVENTION

According to an aspect of present invention, it provides a method for calibrating a touchscreen panel, where the touchscreen panel is arranged in a working range of an industrial robot so that the industrial robot is able to touch a touchscreen of the touchscreen panel, the method including the steps of: (a) defining at least one area of the touchscreen with predetermined accuracy for position measuring; (b) recording a plurality of kinematic parameters of the industrial robot on a plurality of first touch points on the at least one area of the touchscreen; (c) recording a plurality of first position values on the plurality of first touch points on the at least one area of the touchscreen; (d) determining a first calibration data for the kinematic model of the industrial robot using the kinematic parameters and using the first position values; (e) computationally correcting errors of the kinematic model of the industrial robot using the first calibration data; (f) recording a plurality of second position values on a plurality of second touch points on the at least one area with at least a portion of its border extending outwards; (g) determining a second calibration data for the touchscreen using the kinematic parameters and using the second position values; (h) computationally correcting errors of position measurement of the touchscreen using the second calibration data; and iteratively repeating the steps (b) through (h) for different postures of the industrial robot until the iteration step no longer results in significant improvement of the error correction of the kinematic model of the industrial robot.

According to another aspect of present invention, it provides a system for calibrating a touchscreen panel including an industrial robot and the touchscreen panel being configured to execute the method the method for calibrating a touchscreen panel.

According to another aspect of present invention, it provides an industrial robot, including a robot controller and a robot memory being configured to execute the method for calibrating a touchscreen panel.

According to another aspect of present invention, it provides a touchscreen panel, including a touchscreen panel controller and touchscreen panel memory being configured to execute the method for calibrating a touchscreen panel.

By using the method and the system, the industrial robot and the touchscreen panel using the same, the area of the touchscreen panel under condition of adequate position measuring accuracy is firstly defined, and the relatively small area of the touchscreen panel provides an acceptable position measuring accuracy. Thus, this makes it possible to calibrate the industrial robot using the touchscreen panel, which needs to be calibrated using extra calibration tool otherwise, in particular using the at least one area as defined thereon. By reusing the industrial robot in an industrial robot commissioning system for the purpose of touchscreen panel calibration, this is helpful for resolving the conflicting requirements of adding new functionality of calibration and reducing the cost of the system. It is advantageous because no extra device is needed for the touchscreen panel calibration.

Preferably, a number of the first touch points is equal to or above a number of the kinematics parameter of the industrial robot.

Preferably, a number of the second touch points is equal to or above a dimensional number of the touchscreen.

Preferably, in the step (e), the at least area is extended to enclose the previous one. This allows for the areas to gradually enlarge from the previous, thus the enlargement of the areas with the progress of the iterations loops will not lead to significant degradation of the calibration accuracy.

Preferably, in the step (e), at least a portion of the second touch points are distributed in the extended part of the at least one area. Thus, it renders a refinery of mapping function for fitting the error distribution in an enlarged area.

Preferably, the method further includes steps following the termination of the iteration: determining a third calibration data for the touchscreen using the kinematic parameters and using the second position values; and computationally correcting errors of position measurement of the touchscreen for the rest areas using the third calibration data. At the termination of the iteration, the industrial robot's absolute accuracy converges which, for example, is represented by the industrial robot end effector position accuracy in Cartesian Space, Thus its optimum kinematic model is found serving the calibration of the whole area of the touchscreen. As a result, calibration of the whole area of the touchscreen can achieved.

BRIEF DESCRIPTION OF THE DRAWINGS

The subject matter of the invention will be explained in more detail in the following text with reference to preferred exemplary embodiments which are illustrated in the drawings, in which:

FIG. 5 illustrates the touchscreen calibration by use of the industrial robot in one of the iterations according to an embodiment of present invention The reference symbols used in the drawings, and their meanings, are listed in summary form in the list of reference symbols. In principle, identical parts are provided with the same reference symbols in the figures.

PREFERRED EMBODIMENTS OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods and programming procedures, devices, and circuits are omitted so not to obscure the description of the present invention with unnecessary detail.

Figure 1:
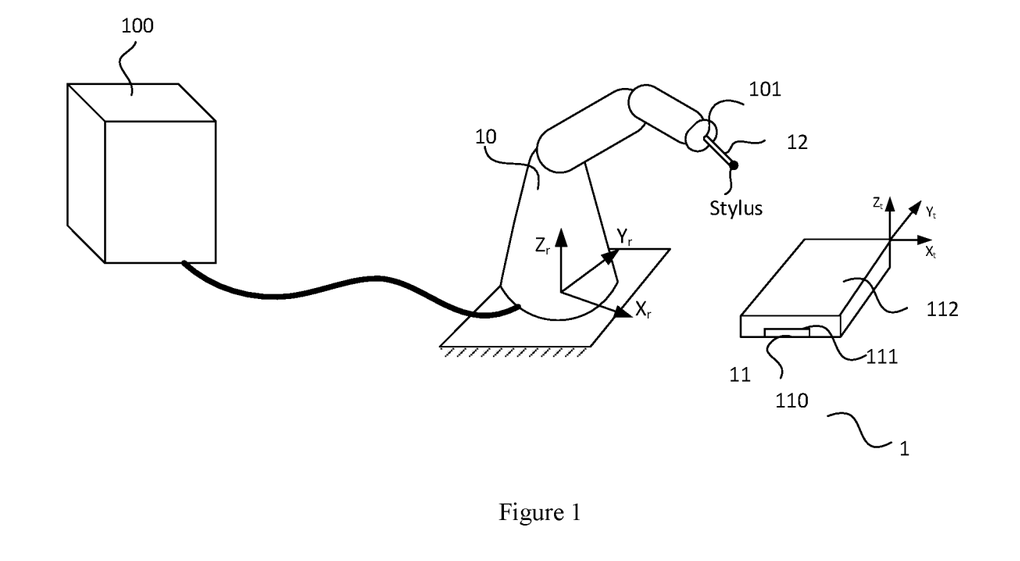
FIG. 1 illustrates an industrial robot commissioning system according to an embodiment of present invention.

FIG. 1 illustrates an industrial robot commissioning system according to an embodiment of present invention. As shown in FIG. 1, the industrial robot system 1 includes an industrial robot 10 and a touchscreen panel 11. The posture, position and movement of the industrial robot 10 makes reference to an industrial robot coordinate system $x_r$, $y_r$, $z_r$, for example the base coordinate system of the industrial robot. The industrial robot 10 is provided with an industrial robot controller 100 including at least one processor, memory and communication means. In this example, the industrial robot controller 100 is utilized for carrying out most of the steps in the method according to the invention. The touchscreen panel 11 includes a touchscreen 112, touchscreen panel controller 110 and touchscreen panel memory 111 that can read and record a touch position respect to touchscreen coordinate system $x_t$, $y_t$, $z_t$ by a stylus. As an alternative, the touchscreen panel controller 110 is utilized for carrying out most of the steps in the method according to the invention. The stylus can be electro-magnetic-based, ultrasonic-based, and mechanical-based. The touchscreen 112 of the touchscreen panel 11 can also display and to control how it is displayed. It is preferred that the touchscreen controller 110 has calculation power to run an APP. Preferably, regarding the measuring capability, a commercial available tablet from WACOM can reach 5 micrometre touch. The industrial robot controller 100 and the touchscreen panel controller 110 can communicate with each other via a communication link, which make up of industrial robot commissioning control system. An end effector 12 is attached to the industrial robot flange 101 in a known position with respect to the industrial robot coordinate system $x_r$, $y_r$, $z_r$, and the touchscreen panel 11 is arranged in the working range of the industrial robot 10 so that the end effector 12 can move with the industrial robot 10 and touch the touchscreen 112 of the touchscreen panel 11 when the industrial robot 11 assumes certain posture with preprogrammed robot targets. The end effector 12 with the stylus to its end can be in a fixed relation to the industrial robot 100 with stylus electro-magnetic-based, ultrasonic-based, or mechanical-based that can touch the touchscreen with electro-magnetic beam, ultrasonic beam or mechanical contact. Correspondingly, the touchscreen 112 of the touchscreen panel 11 can detect the electro-magnetic beam, ultrasonic beam or mechanical contact reading and recording the touch point. As compared with the end effector in fixed relation to the industrial robot 10, an alternative end effector is different in that its stylus can protrude with respect to the industrial robot 10.

The industrial robot system 1 must be automatic and accurate to get the stylus of the end effector 12 to touch the touchscreen 112 of the touchscreen panel 11. In order to achieve the automatic and accurate touch point, a soft and compliant control of the robot is needed. In order to achieve such a soft and compliant control of the robot it is possible to use force control including a force/torque sensor. If force control is not included in the robot installation, it is possible to adapt the touchscreen panel controller 110 to send to the industrial robot controller 100 a signal indicating occurrence of the touch in order to move the robot into contact with the touchscreen 112 of the touchscreen panel 11, but still be compliant to find the exact accurate position of the touch point. Once the end effector 12 is in the touch position, the position data can be read within the touchscreen panel controller 110 and used together with the reference values for calculations of the relation between the industrial robot coordinate system $x_r$, $y_r$, $z_r$, and the touchscreen coordinate system $x_t$, $y_t$, $z_t$.

Figure 2:
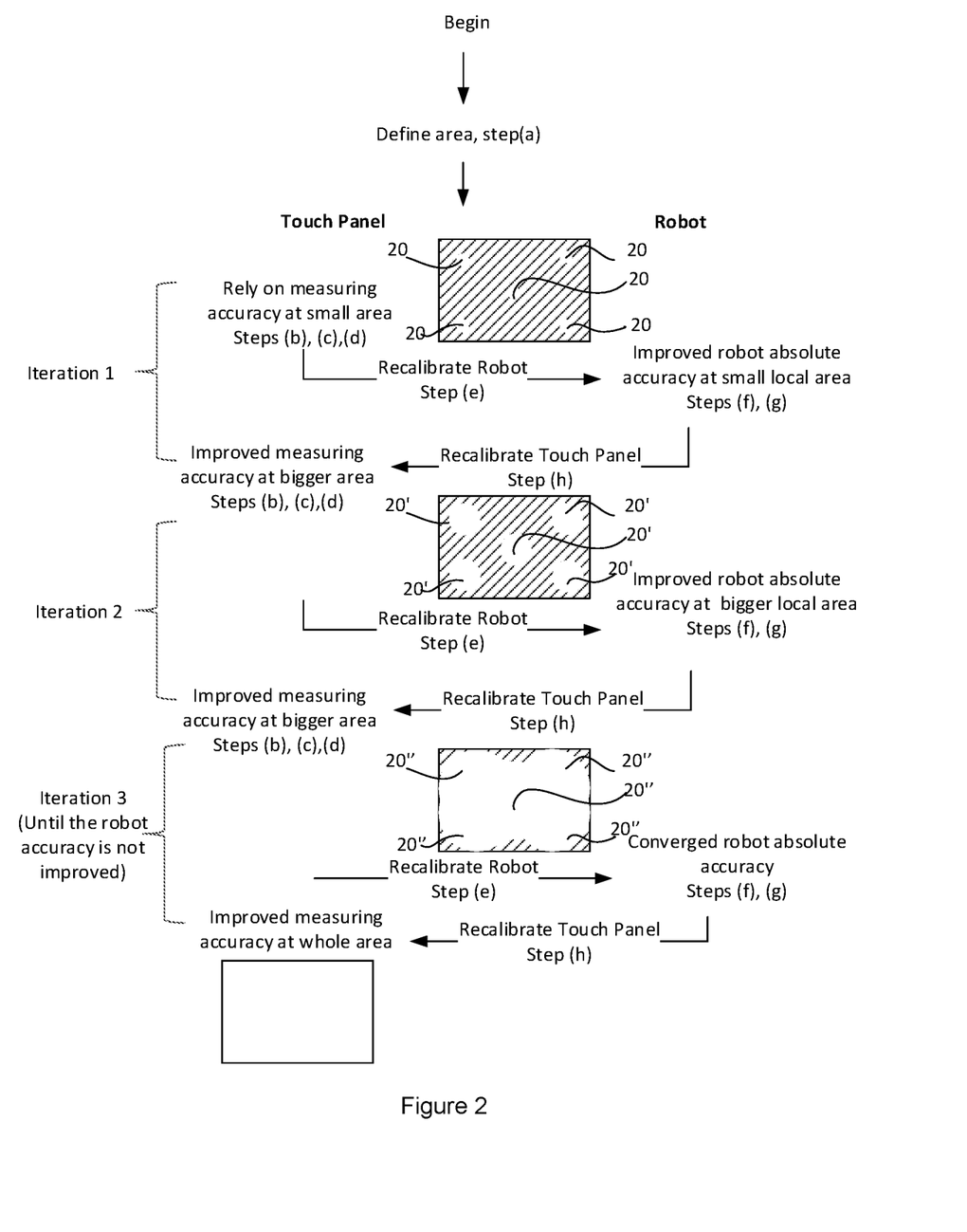
FIG. 2 shows schematic view of touchscreen panel calibration with an industrial robot according to an embodiment of present invention, where the arrow indicates the progress of the touchscreen panel calibration process.

FIG. 2 shows schematic view of touchscreen panel calibration with an industrial robot according to an embodiment of present invention, where the arrow indicates the progress of the touchscreen panel calibration process.

In accordance with FIG. 2, the calibration method for calibrating the touchscreen panel 11 here begins with defining at least one area 20 of the touchscreen 112 with predetermined accuracy for position measuring, in step (a). The area 20 defined on the touchscreen 112 is, for example, circle-shaped having a radius. In order to achieve a predetermined position measuring accuracy by the touchscreen panel 11, each of the at least one area 20 is selected such that it covers a plurality of sensing elements along a direction of position measuring, for example a diameter of the circle-shaped area 20, and the number of such sensing elements is kept below a maximum so that an accumulated error accounted for the plurality of sensing elements would not exceed a threshold, for example the accuracy at the area at 2 mm*2 mm would be good depending on the hardware resolution. The accuracy of touchscreen panel at an area as small as 2 mm*2 mm can be considered as the nominal resolution value. Namely, for a touch panel with 0.05 mm resolution, the position measuring accuracy could be 0.05 mm at the small area. Below is an equation exemplify the correlation between accumulative error with the number of sensing elements:

$$E = \Sigma_{i=1}^{N} ei \qquad (1)$$

where E represents accumulative error, e represents error of sensing element i, and N is the number of the sensing elements arranged between the measuring points.

By defining the area of the touchscreen panel under condition of adequate position measuring accuracy, the relatively small area 20 of the touchscreen panel 11 provides an acceptable position measuring accuracy. Thus, this makes it possible to calibrate the industrial robot using the touchscreen panel, which needs to be calibrated using extra calibration tool otherwise, in particular using the at least one area 20 as defined thereon.

Iteration loop includes steps (b) through (h) with the progress of enlargement of the area touched by the industrial robot, such as the areas indicated by reference sign 20 in iteration 1, the areas 20' in iteration 2, and the areas 20" in iteration 3. As shown in FIG. 2, the iteration loops are terminated after three rounds of iteration when the iteration step no longer results in significant improvement of the error correction of the kinematic model of the industrial robot. The improvement significance can be measured by how accurate the kinematic model of the industrial robot is corrected, for example an error of the industrial robot's end effector position is adjusted below a predetermined level, such as 0.01 mm in Cartesian Space. Under this condition, the industrial robot's absolute accuracy converges which, for example, is represented by the industrial robot end effector position accuracy in Cartesian Space, thus its optimum kinematic model is found serving the calibration of the whole area of the touchscreen. After the industrial robot is recalibrated, the robot accuracy can be used as a reference for recalibrating the touch panel. Typically, robot can reach 0.1 mm accuracy at 100 mm*100 mm area after kinematics recalibration.

In accordance with step (b), a plurality of first touch points on the at least one area 20 of the touchscreen 112 are touched by the industrial robot 10, and a plurality of kinematic parameters of the industrial robot 10 are recorded for its postures in touching the first touch points on the area 20. For example, these kinematic parameters can be stored in the industrial robot memory. In step (c), a plurality of first position values on the plurality of first touch points on the at least one area of the touchscreen 112 are recorded. For example, these first position values can be stored in the touchscreen panel memory.

When the industrial robot kinematic parameters and the first touch points position values have been picked up, in step (d) a first calibration data for the kinematic model of the industrial robot is determined using the kinematic parameters and using the first position values. The first calibration data include data representing differential information between locations of a pair of first touch points within an area and data representing differential information between the industrial robot kinematic parameters assumed at its postures in touching the pair of first touch points. The first calibration data may comprise data representing the above differential information concerning a plurality of pairs of the first touch points, and how many of the first touch point pairs can be determined so as to give sufficient information entropy to calculate solutions of the industrial robot kinematic parameters. Then, in step (e), computationally correcting errors of the kinematic model of the industrial robot using the first calibration data. For example, the principle of optimization-based design may be used to search for the optimum solutions of the industrial robot kinematic parameters, which will be described in detail thereafter according to FIG. 4, and the improved local absolute accuracy can be reached at 0.1 mm at 100 mm*100 mm.

Result of experiment shows that given the industrial robot kinematic parameters as determined in the step (e), the industrial robot kinematic model provides an accurate description of its various postures for touching points in the area with its border extending outwards, and thus the distance of touching points in the extended area can be calculated to an acceptable accuracy according to the industrial robot kinematic model. In other words, the industrial robot kinematic model provides posture prediction with a good accuracy for touching points occurring in a larger area on the touchscreen than the one before border-extension with the error-correction of its kinematic model. In particular, the industrial robot end effector position error caused by kinematics parameters has a continuous distribution in Cartesian Space. The calibrated kinematics parameters have achieved proper accuracy in the defined areas. When these defined areas covering the touchscreen panel, the industrial robot accuracy in the areas nearby will not change dramatically. Therefore, robot movement in larger area can still have relatively accurate prediction.

By reusing the industrial robot in an industrial robot commissioning system for the purpose of touchscreen panel calibration, this is helpful for resolving the conflicting requirements of adding new functionality of calibration and reducing the cost of the system. It is advantageous because no extra device is needed for the touchscreen panel calibration.

Figure 3A:
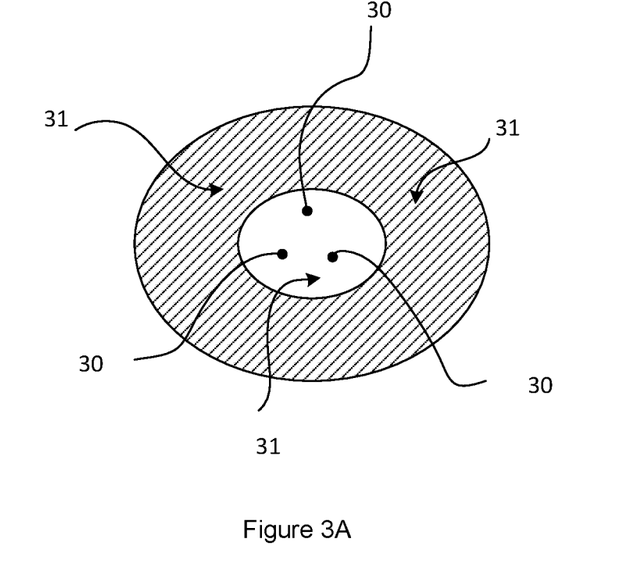
FIGS. 3A and 3B show variants of the area and its extension according to an embodiment of present invention.
Figure 3B:
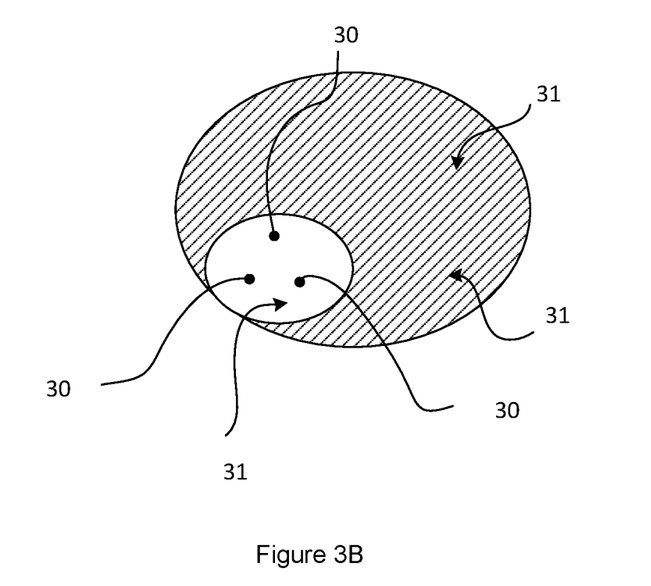

FIGS. 3A and 3B show variants of the area and its extension according to an embodiment of present invention. As shown in FIG. 3A, the area is enlarged by extending a portion of its border outwards; as shown in FIG. 3B, the border of the previous area is extended equally from its centre, thus the extended area encloses the previous. The portion indicated by the slash mark, in either of FIGS. 3A and 3B, represent an enlargement of the area on the touchscreen. The first touching points as described above are indicated by reference sign 30, and the second touching points are indicated by reference sign 31. In order to speed up the calibration of the touchscreen panel, it is desirable to have the enlargement as broad as possible. The larger of the extension is, the fewer itineration times needed to complete the touchscreen panel calibration. On the other hand, the enlargement should not lead to significant degradation of the calibration accuracy. For example, the enlarge scale can be two times as before. Taking circle area as example: $\pi r^2 \to \pi (2r)^2 \to \pi (2^2 r)^2 \to \ldots \pi (2^n r)^2$, such an exponential enlarging can be quicker and quicker with the increase of iteration, where the area is circle-shaped and n indicates the enlarge scale for the smallest area which radius as of r. In addition, at least a portion of the second touch points 31 are distributed in the extended part of the at least one area, which can be used to refine the mapping function in eq. (4) as below for fitting the error distribution in the enlarged area.

Back to FIG. 2, according to step (f), a plurality of second touch points on the at least one area with at least a portion of its border extending outwards are touched by the industrial robot 10, and a plurality of second position values recorded on the locations of these second touch points on the touchscreen, for example by the touchscreen panel memory.

When the industrial robot kinematic parameters and the second touch point position values have been picked up, in step (g), a second calibration data is determined for the touchscreen using the kinematic parameters and using the second position values. The second calibration data include data representing differential information between locations of a pair of second touch points within the extended area and data representing differential information between the industrial robot kinematic parameters assumed at its postures in touching the pair of second touch points. The second calibration data may comprise data representing the above differential information concerning a plurality of pairs of the second touch points, and how many of the second touch point pairs can be determined so as to give sufficient information entropy to calculate solutions of the locations of the second points on the extended areas of the touchscreen. Then, in step (h), computationally correcting errors of position measurement of the touchscreen using the second calibration data. For example, the principle of optimization-based design may be used to search for the optimum solutions of the position measurements, which will be described in detail thereafter according to FIG. 5.

Following the termination of the iteration, the method further includes determining a third calibration data for the touchscreen using the kinematic parameters and using the second position values; and computationally correcting errors of position measurement of the touchscreen for the rest areas using the third calibration data. As a result, the whole area of the touchscreen has been calibrated.

Figure 4:
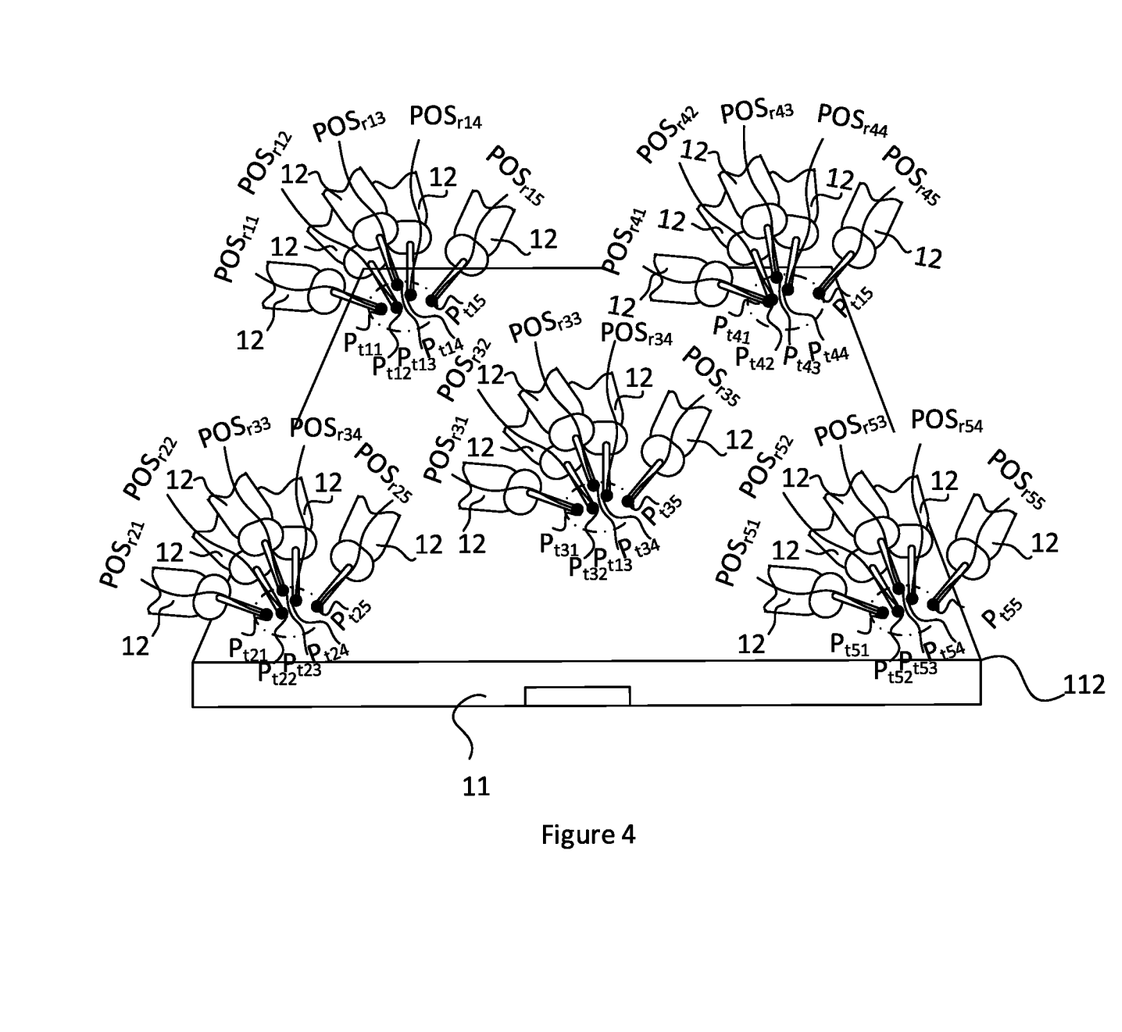
FIG. 4 illustrates the industrial robot calibration by use of the touchscreen panel in one of the iterations according to an embodiment of present invention.

FIG. 4 illustrates the industrial robot calibration by use of the touchscreen panel in one of the iterations according to an embodiment of present invention. The position obtained by the touchscreen panel can be used for identifying the robot kinematics parameters. The touchscreen panel 11 is arranged in the working range of the industrial robot. An end effector 12 is attached to the industrial robot flange. As shown in FIG. 4, for example on the touchscreen 112 of the touchscreen panel 11, there are defined five areas each in a shape of circle, assuming the position measuring accuracy for the each area is high enough for calibration of the industrial robot 10. As discussed previously according to FIG. 2, each area sees an adequate position measuring accuracy by keeping the sensing elements in the area as fewer than a predetermined level or as a result of its calibration with an industrial robot having a good position measuring accuracy. Besides, the shape of the area 20, 20', 20" enlarges with the progress of iteration loops according to FIG. 2 to some extend some of them may overlap with each other. With the enlargement of the areas defined on the touchscreen 112 and for each of the iteration loop, the first touching points distributed in the areas 20, 20', 20" by the end effector 12 held by the industrial robot.

The industrial robot controller is programmed and control the industrial robot to move in a compliant way until the stylus of the end effector 12 touches a point on the touchscreen 112, for example with soft servo. The stylus is calculated with built-in mathematics in the robot software in the robot coordinate system $x_r, y_r, z_r$. The industrial robot memory can record a posture of the industrial robot in the industrial robot coordinate system $x_r, y_r, z_r$ when the stylus of the end effector 12 touches the point of the touchscreen 112. The touchscreen memory can record a position of the first touch point on the touchscreen 112 in the touchscreen coordinate system $x_t, y_t, z_t$. The programed industrial robot controller then controls the industrial robot to repeat the steps for at least another touches on the touchscreen 112, wherein the number of the touch is equal or above the number of the kinematics parameter of the industrial robot. For example, if the industrial robot has 4 kinematics parameters, then at least three touches on the touchscreen 112 with the industrial robot postures in the industrial robot coordinate system $x_r, y_r, z_r$ and first touch point positions in the touchscreen coordinate system $x_t, y_t, z_t$. The industrial robot controller can optimize the kinematics parameters of the industrial robot using the at least two postures of the industrial robot, the at least two positions of the first touch points, and the relation between the industrial robot coordinate system and the touch screen coordinate system. In particular for example, the industrial robot controller can calculate the stylus position with function of the robot DH parameters as at least N touches (N equals to the number of the interested kinematic parameters). Typically, a series robot can be described by Denavit Hartenberg (DH) model, which has four parameters for each robot link. Namely, link length, link offset, link twist, and joint angle. Therefore, a 6-Axis robot has 24 DH parameters in total. In case of calibration all the DH parameters, it requires at least 24 touches. In general, the number of the first touch points is equal to or above a number of the kinematics parameter of the industrial robot.

When applied to the embodiment of present invention as described according to FIG. 2, the industrial robot is programed to move to N areas, and touch M points (the first touching points) in each area.

$$POSrij = f(DH, TCP)(i=1 \text{ to } N, j=1 \text{ to } M) \quad (2)$$

With N*M pre-programmed targets, an optimization problem can be solved with an objective function as $$\Sigma_{i=1}^{N}\Sigma_{j=1}^{M-1}\Sigma_{k=j}^{M}(\|POSrij - POSrik\| - |P'tij - P'tik\|), \\ (i=1 \sim N, j=1 \sim M) \quad (3)$$

Where POSrij indicates the stylus tip position w.r.t (with respect to) robot base frame at i area, j touching, TCP indicates the tool center point of stylus tip w.r.t. robot flange frame, Ptij indicates the touching point position w.r.t to touch panel frame at i area, j touching. Such a robot calibration does not need to know the exact robot tool center point TCP (such as the end effector 12), and the touch panel coordinate system, since TCP is included in the optimization variables while only distance information is used in Eq. (3). It means the stylus can be mounted on robot arbitrary, while the touch panel can be arranged in the robot workspace arbitrary.

The calibrated touchscreen can be reused for absolute accuracy calibration without introducing additional hardware for robot kinematics calibration. It is helpful for increasing the integration degree of the industrial robot system, reducing the system complexity and cost. And the space occupation is reduced as well.

Figure 5:
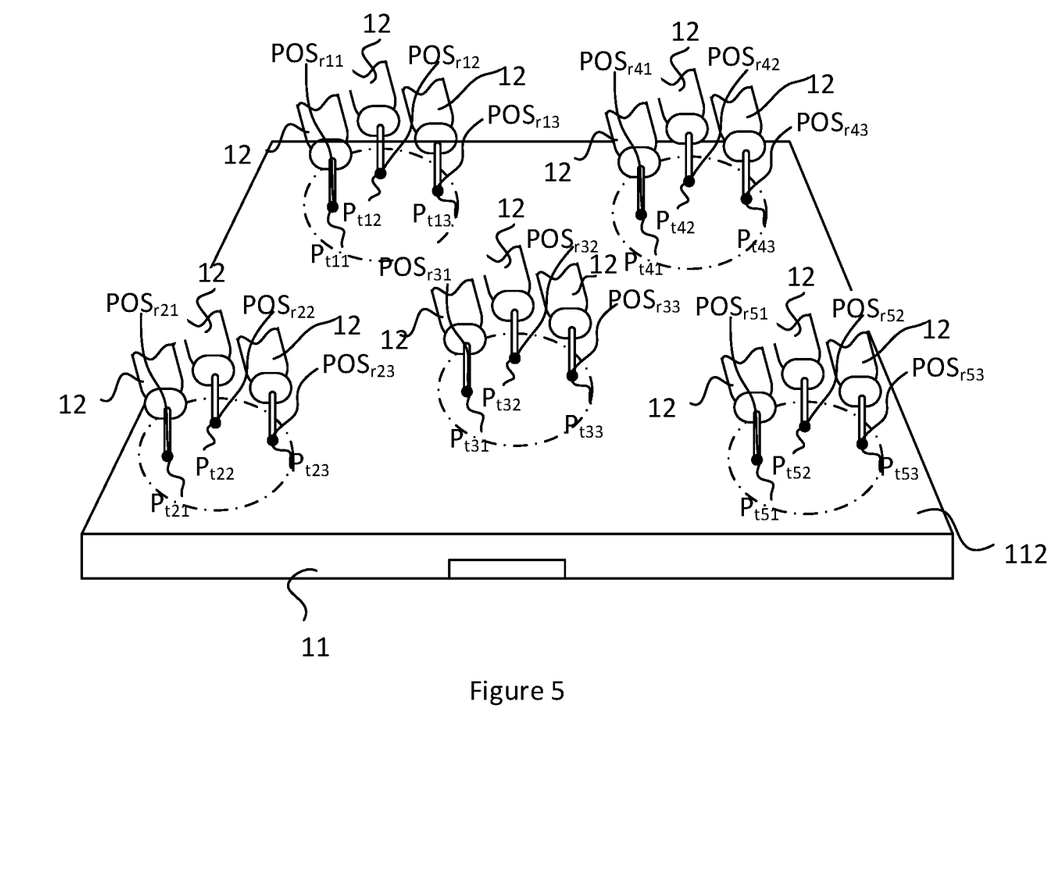

FIG. 5 illustrates the touchscreen calibration by use of the industrial robot in one of the iterations according to an embodiment of present invention. The industrial robot controller is programmed and control the industrial robot to move in a compliant way until the stylus of the end effector touches a point on the touchscreen 112, for example with soft servo. The stylus is calculated with built-in mathematics in the robot software in the robot coordinate system $x_r$, $y_r$, $z_r$. The industrial robot controller can record a position of the stylus of the end effector in the industrial robot coordinate system $x_r$, $y_r$, $z_r$, when it touches the point of the touchscreen 112. The touchscreen controller can record a position of the touch point on the touchscreen 112 in the touchscreen coordinate system $x_t$, $y_t$, $z_t$. The programed industrial robot controller then control the industrial robot to repeat the steps for at least another two touches on the touchscreen 112 with the stylus positions in the industrial robot coordinate system $x_r$, $y_r$, $z_r$ and touch point positions in the touchscreen coordinate system $x_t$, $y_t$, $z_t$.

When applied to the embodiment of present invention as described according to FIG. 2, the industrial robot is programmed to move to N area and translate target in the same interval to touch Z points (Z, the second touching points, at least larger than the number of unknown variables of the two dimensional polynomial function, and the number of the second touch points is equal to or above a dimensional number of the touchscreen) in each area.

$$Ptij = g(Pixelij\_x, Pixelij\_y, Pixelij\_z)(i=1 \text{ to } N, j=1 \text{ to } Z) \quad (4)$$

Where g is a mapping function from pixel to physical position. For example g could be a polynomial function, Pixelij_x, Pixelij_y, or Pixelij_z, indicates the original pixel reading of touchscreen panel at X, Y, Z direction w.r.t touch panel frame.

With N*Z preprogrammed targets, an optimization problem at each area can be solved with an objective function as $$\Sigma_{i=1}^{N} \Sigma_{j=1}^{Z} \|\|POSri1 - POSrij\| - \|Pti1 - Ptij\|\|, (i=1\sim N, j=1\sim Z) \quad (5)$$

Where POSrij indicates the stylus tip position w.r.t (with respect to) robot base frame at i area, j touching, TCP indicates the tool center point of stylus tip w.r.t. robot flange frame, Ptij indicates the touching point position w.r.t to touch panel frame at i area, j touching. Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for calibrating a touchscreen panel, where the touchscreen panel is arranged in a working range of an industrial robot so that the industrial robot is able to touch a touchscreen of the touchscreen panel, the method including the steps of:
   (a) defining at least one area of the touchscreen with predetermined accuracy for position measuring;
   (b) recording a plurality of kinematic parameters of the industrial robot on a plurality of first touch points on the at least one area of the touchscreen;
   (c) recording a plurality of first position values on the plurality of first touch points on the at least one area of the touchscreen;
   (d) determining a first calibration data for the kinematic model of the industrial robot using the kinematic parameters and using the first position values;
   (e) computationally correcting errors of the kinematic model of the industrial robot using the first calibration data;
   (f) recording a plurality of second position values on a plurality of second touch points on the at least one area with at least a portion of its border extending outwards;
   (g) determining a second calibration data for the touchscreen using the kinematic parameters and using the second position values;
   (h) computationally correcting errors of position measurement of the touchscreen using the second calibration data; and
   iteratively repeating the steps (b) through (h) for different postures of the industrial robot until the iteration step no longer results in significant improvement of the error correction of the kinematic model of the industrial robot.

2. The method according to claim 1, wherein:
   a number of the first touch points is equal to or above a number of the kinematics parameter of the industrial robot.

3. The method according to claim 2, wherein:
   a number of the second touch points is equal to or above a dimensional number of the touchscreen.

4. The method according to claim 3, wherein
   in the step (e), the at least area is extended to enclose the previous one.

5. The method according to claim 3, wherein:
   in the step (e), at least a portion of the second touch points are distributed in the extended part of the at least one area.

6. The method according to claim 2, wherein:
   in the step (e), the at least area is extended to enclose the previous one.

7. The method according to claim 2, wherein:
   in the step (e), at least a portion of the second touch points are distributed in the extended part of the at least one area.

8. The method according to claim 2, further includes steps following the termination of the iteration:
   determining a third calibration data for the touchscreen using the kinematic parameters and using the second position values; and
   computationally correcting errors of position measurement of the touchscreen for the rest areas using the third calibration data.

9. The method according to claim 1, wherein:
   a number of the second touch points is equal to or above a dimensional number of the touchscreen.

10. The method according to claim 9, wherein:
in the step (e), the at least area is extended to enclose the previous one.

11. The method according to claim 9, wherein:
in the step (e), at least a portion of the second touch points are distributed in the extended part of the at least one area.

12. The method according to claim 9, further includes steps following the termination of the iteration:
determining a third calibration data for the touchscreen using the kinematic parameters and using the second position values; and
computationally correcting errors of position measurement of the touchscreen for the rest areas using the third calibration data.

13. The method according to claim 1, wherein:
in the step (e), the at least area is extended to enclose the previous one.

14. The method according to claim 13, wherein:
in the step (e), at least a portion of the second touch points are distributed in the extended part of the at least one area.

15. The method according to claim 13, further includes steps following the termination of the iteration:
determining a third calibration data for the touchscreen using the kinematic parameters and using the second position values; and
computationally correcting errors of position measurement of the touchscreen for the rest areas using the third calibration data.

16. The method according to claim 1, wherein:
in the step (e), at least a portion of the second touch points are distributed in the extended part of the at least one area.

17. The method according to claim 1, further includes steps following the termination of the iteration:
determining a third calibration data for the touchscreen using the kinematic parameters and using the second position values; and
computationally correcting errors of position measurement of the touchscreen for the rest areas using the third calibration data.

18. A system for calibrating a touchscreen panel including an industrial robot, comprising:
the touchscreen panel being configured to:
(a) define at least one area of the touchscreen with predetermined accuracy for position measuring;
(b) record a plurality of kinematic parameters of the industrial robot on a plurality of first touch points on the at least one area of the touchscreen;
(c) record a plurality of first position values on the plurality of first touch points on the at least one area of the touchscreen;
(d) determine a first calibration data for the kinematic model of the industrial robot using the kinematic parameters and using the first position values;
(e) computationally correct errors of the kinematic model of the industrial robot using the first calibration data;
(f) record a plurality of second position values on a plurality of second touch points on the at least one area with at least a portion of its border extending outwards;
(g) determine a second calibration data for the touchscreen using the kinematic parameters and using the second position values;
(h) computationally correct errors of position measurement of the touchscreen using the second calibration data; and
iteratively repeat the steps (b) through (h) for different postures of the industrial robot until the iteration step no longer results in significant improvement of the error correction of the kinematic model of the industrial robot.

19. An industrial robot arranged in a working range of a touchscreen panel, comprising:
a robot controller and a robot memory being configured to execute instructions to:
(a) define at least one area of the touchscreen with predetermined accuracy for position measuring;
(b) record a plurality of kinematic parameters of the industrial robot on a plurality of first touch points on the at least one area of the touchscreen;
(c) record a plurality of first position values on the plurality of first touch points on the at least one area of the touchscreen;
(d) determine a first calibration data for the kinematic model of the industrial robot using the kinematic parameters and using the first position values;
(e) computationally correct errors of the kinematic model of the industrial robot using the first calibration data;
(f) record a plurality of second position values on a plurality of second touch points on the at least one area with at least a portion of its border extending outwards;
(g) determine a second calibration data for the touchscreen using the kinematic parameters and using the second position values;
(h) computationally correct errors of position measurement of the touchscreen using the second calibration data; and
iteratively repeat the steps (b) through (h) for different postures of the industrial robot until the iteration step no longer results in significant improvement of the error correction of the kinematic model of the industrial robot.

20. A touchscreen panel, including a touchscreen panel controller and touchscreen panel memory being configured to execute instructions to:
(a) define at least one area of the touchscreen with predetermined accuracy for position measuring;
(b) record a plurality of kinematic parameters of the industrial robot on a plurality of first touch points on the at least one area of the touchscreen;
(c) record a plurality of first position values on the plurality of first touch points on the at least one area of the touchscreen;
(d) determine a first calibration data for the kinematic model of the industrial robot using the kinematic parameters and using the first position values;
(e) computationally correct errors of the kinematic model of the industrial robot using the first calibration data;
(f) record a plurality of second position values on a plurality of second touch points on the at least one area with at least a portion of its border extending outwards;
(g) determine a second calibration data for the touchscreen using the kinematic parameters and using the second position values;
(h) computationally correct errors of position measurement of the touchscreen using the second calibration data; and
iteratively repeat the steps (b) through (h) for different postures of the industrial robot until the iteration step no longer results in significant improvement of the error correction of the kinematic model of the industrial robot.

* * * * *